(12) United States Patent
Ohzono (10) Patent No.: US 7,798,509 B2
(45) Date of Patent: Sep. 21, 2010

(54) VEHICLE MOTORCYCLE LIGHT UNIT HAVING LENS

(75) Inventor: Gen Ohzono, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 297 days.

(21) Appl. No.: 11/692,721

(22) Filed: Mar. 28, 2007

(65) Prior Publication Data

US 2007/0230202 A1  Oct. 4, 2007

(30) Foreign Application Priority Data

Mar. 31, 2006 (JP) ............................... 2006-096529

(51) Int. Cl.
*B62D 25/18* (2006.01)
(52) U.S. Cl. .................. 280/152.05; 362/473; 362/549
(58) Field of Classification Search ................. 362/473, 362/506, 540, 368, 370, 457, 459, 475, 476, 362/483, 487, 541, 546, 548, 549, 497, 498, 362/499; 280/152.05; 340/432
See application file for complete search history.

(56) References Cited

U.S. PATENT DOCUMENTS

| 4,733,335 | A * | 3/1988 | Serizawa et al. ............ 362/503 |
| 6,390,656 | B1 * | 5/2002 | Suda et al. .................. 362/475 |
| 7,004,608 | B2 * | 2/2006 | Goller ......................... 362/546 |
| 7,182,494 | B2 * | 2/2007 | Nakayama et al. .......... 362/545 |

FOREIGN PATENT DOCUMENTS

JP  10-297569  11/1998

* cited by examiner

*Primary Examiner*—Gunyoung T Lee
(74) *Attorney, Agent, or Firm*—Keating & Bennett, LLP (57) ABSTRACT

The light unit includes a lamp body and a lens having engagement members. The engagement members engage directly with the body of a vehicle (for example, a motorcycle). The engagement members preferably engage with a vehicle body exterior component such as a side cover. By engaging directly with the body, the alignment accuracy between the light unit and the side cover is improved.

13 Claims, 14 Drawing Sheets

VEHICLE MOTORCYCLE LIGHT UNIT HAVING LENS

RELATED APPLICATIONS

The present application is based on and claims priority under 35 U.S.C. §119(a)-(d) to Japanese Patent Application No. 2006-096529, filed on Mar. 31, 2006, the entire contents of which is hereby expressly incorporated by reference herein.

BACKGROUND OF THE INVENTION

1. Field of the Invention

The present invention relates to a light unit for a vehicle.

2. Description of the Related Art

Conventional motorcycles have a tail lamp unit that includes, for example, a lamp body and a lens covering an opening in the lamp body. A bracket that is separate from the body of the motorcycle and from the tail lamp unit is used to attach the tail lamp unit to the body. The rear fender and body cover may also attach to the same bracket (see, for example, Japanese Patent Abstract JP-A-10-297569). It is difficult to align the tail lamp unit and the body cover because the bracket is interposed between the two components. The sight lines of the motorcycle may become impaired if the tail lamp unit and the vehicle body cover become misaligned.

To help align the tail lamp unit and body cover, some motorcycles include an alignment line running along the side of the body cover and the lens of the tail lamp unit. Unfortunately, this design requires even greater alignment accuracy. It is difficult to align the tail lamp unit with the vehicle body cover when the parts are located some distance from the vehicle body frame.

SUMMARY OF THE INVENTION

In view of the foregoing, a need exists for a light unit that is more easily aligned with the body of the vehicle.

An aspect of the present invention involves a light unit for a vehicle having a body. The light unit includes a bulb and a lens, which is positioned to the rear of the bulb so as to cover a rear side of the bulb. The bulb acts as a light source. A reflector reflects at least a portion of light from the bulb towards the lens. The lens includes at least one engagement member that engages the body of the vehicle at least when the light unit is attached to vehicle. Directly engaging the light unit with the body of the vehicle simplifies aligning the vehicle body with the lens. By not employing a bracket between the two, the positional accuracy of both members is improved, which enhances the external appearance of the vehicle in comparison to if the members are misaligned.

Another aspect of the invention is directed to a light unit for a vehicle. The light unit includes a lens, a reflector, and an engagement member. The engagement member is formed in the lens and engages with a portion of the vehicle body.

An additional aspect of the invention involves a motorcycle that has an exterior body portion and a light unit. The light includes a bulb that acts as a light source and a lens that is positioned rearward of the bulb. The light unit further includes a reflector, which reflects at least some light from the bulb toward the lens, and an engagement member. The engagement member is formed in the lens and engages with the exterior body portion.

A further aspect of the invention is directed to a light unit for a vehicle that has two outer body covers. The light unit includes an outer lens and an inner lens. At least a portion of the inner lens is disposed inside the outer lens. The light unit further includes a plurality of engagement members that engage with the outer body covers.

The present vehicle light units described above have several features, no single one of which is solely responsible for the desirable attributes. Without limiting the scope of the invention as expressed by the claims, its more prominent features have been discussed briefly above. After considering this discussion, and particularly after reading the section entitled "Detailed Description of the Preferred Embodiments," one will understand how the features of the system and methods provide several advantages over conventional light units.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

The following detailed description is now directed to certain specific embodiments of the invention. In this description, reference is made to the drawings wherein like parts are designated with like numerals throughout the description and the drawings.

An embodiment of a vehicle that has a light unit according to the present invention will now be described. It should be understood that the disclosed embodiment is a preferred embodiment of the present invention and is not intended to limit the scope of the present invention.

FIGS. 1 through 14 illustrate a scooter-type motorcycle 1 equipped with a tail lamp unit or light unit 27 according to a preferred embodiment of the present invention. The terms front, rear, left, and right are taken from the point of view of a rider sitting on the seat of the motorcycle 1. A longitudinal axis of the motorcycle is an axis that generally extends in the direction of travel for the motorcycle 1.

Figure 1:
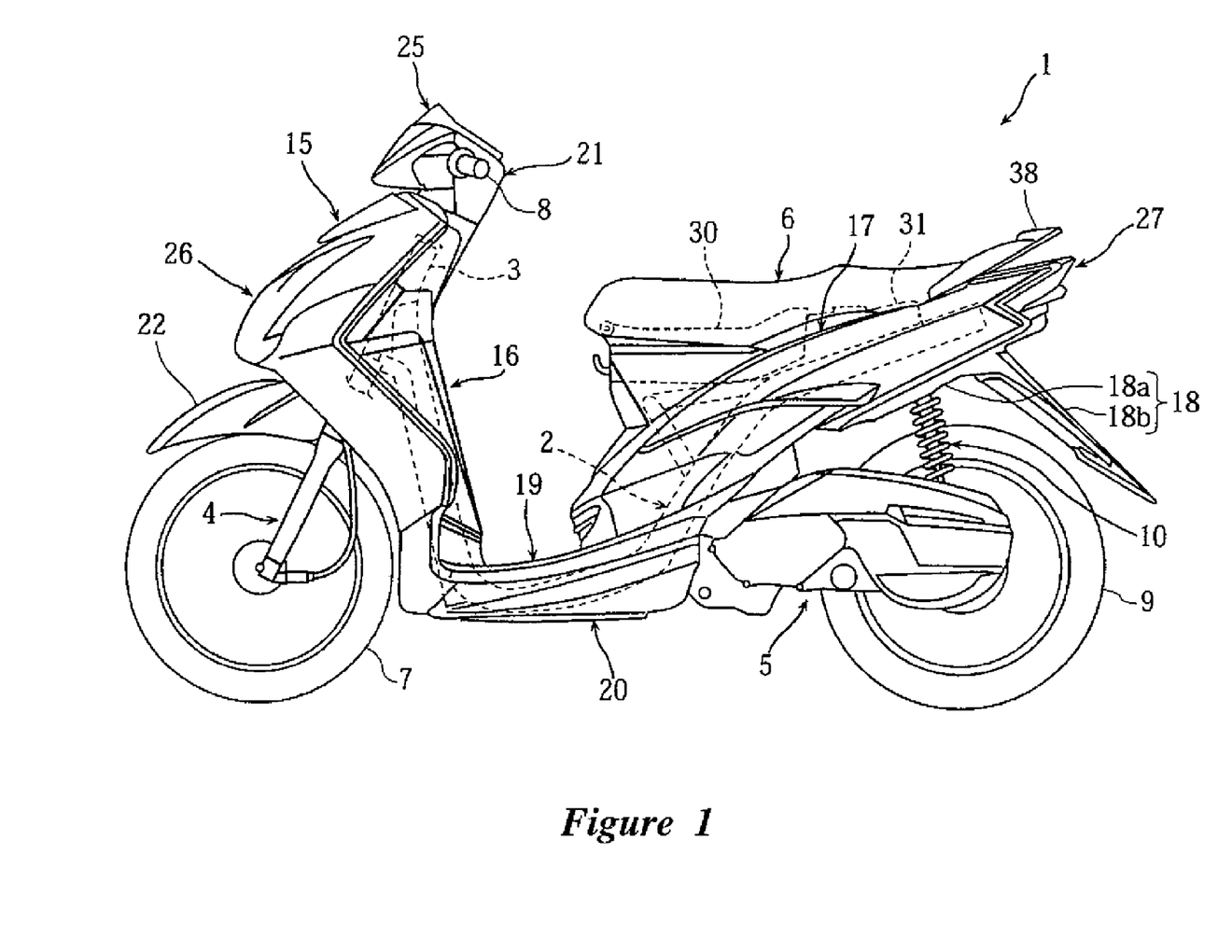
FIG. 1 is a side view of a motorcycle equipped with a tail lamp unit or light unit configured in accordance with a preferred embodiment of the present invention.

The motorcycle 1 includes a skeleton-type body frame 2 and a head pipe 3 positioned at the front end of the body frame 2. The motorcycle 1 further includes a front fork 4 and a swing-type engine unit 5. The front fork 4 is pivotably supported by the head pipe 3 and is capable of being steered left and right. The engine unit 5 is pivotably supported by the body frame 2 and can swing up and down. Mounted above the engine unit 5 on the body frame 2A is a straddle-type seat 6. The seat 6 may accommodate up to two riders.

The front lower end of the front fork 4 supports a front wheel 7. A steering handle 8 is fixed to an upper rear end of the front fork 4. A front fender 22 covers the upper side of the front wheel 7. A rear wheel 9 is rotatably supported by a rear end section of the engine unit 5. A shock absorber 10 is disposed between the engine unit 5 and the body frame 2.

A storage box 30 and a fuel tank 31 are respectively positioned beneath the seat 6. The storage box 30 may be positioned in front of the fuel tank 31. The storage box 30 may support the front end of the seat 6 so as to allow the seat 6 to rotate in an upward direction to access the storage box 30.

The motorcycle 1 may include a grab bar 38 at the rear edge of the seat 6. The grab bar 38 is attached and fixed to the body frame 2 beneath the seat 6. The grab bar 38 can be held by a rear rider.

A handle cover 21 covers the periphery of the steering handle 8. The handle cover 21 may include a meter unit 25. The meter unit 25 may include a speedometer, a fuel level meter, etc. The front side of the head pipe 3 is covered by a front cover 15. The front cover 15 may include a headlight unit 26. The rear side may be covered by a leg shield 16.

Figure 2:
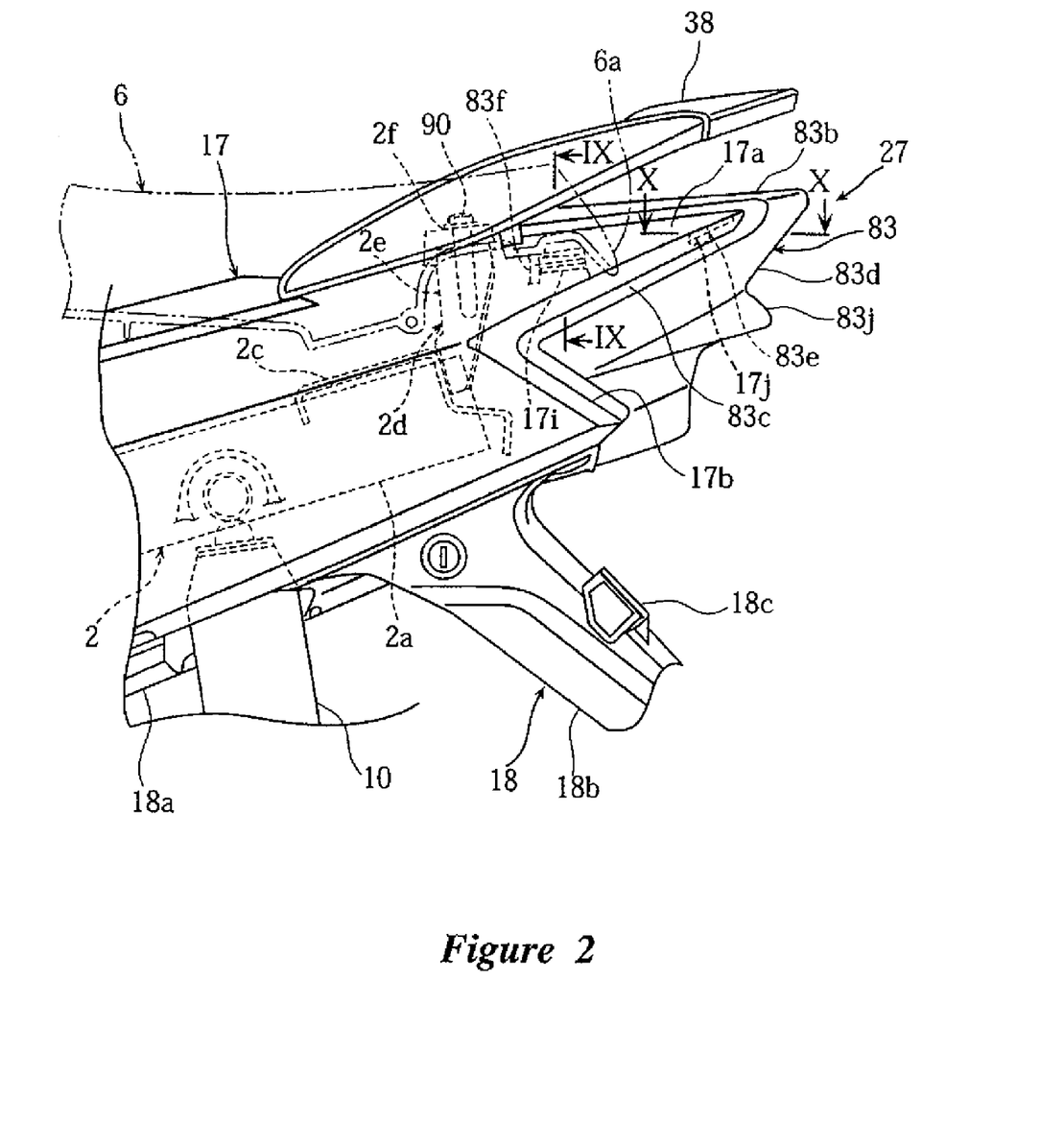
FIG. 2 is an enlarged partially side view of a rear portion of the motorcycle from FIG. 1 showing the light unit.

FIG. 2 is an enlarged partial side view of a rear portion of the motorcycle 1 from FIG. 1. Referring to both FIGS. 1 and 2, the lower side periphery of the seat 6 is covered by the left and right side covers 17, 17. The rider's feat may rest on a footboard 19 between the leg shield 16 and left and right side covers 17, 17. An under cover 20 may cover the lower side of the footboard 19.

A rear fender 18 covers the rear wheel 9. The rear fender 18 may include a front section 18a that covers the front of the rear wheel 9 and a rear section 18b that covers the rear of the rear wheel 9. License plate attachment members 18c, 18c are formed on a rear surface of the rear fender section 18b.

The motorcycle 12 further includes a tail lamp unit or light unit 27. In the illustrated embodiment, the light unit 27 is located near the rear end section of the left and the right side covers 17, 17. The light unit 27 preferably attaches to a rear end section of the body frame 2.

Figure 3:
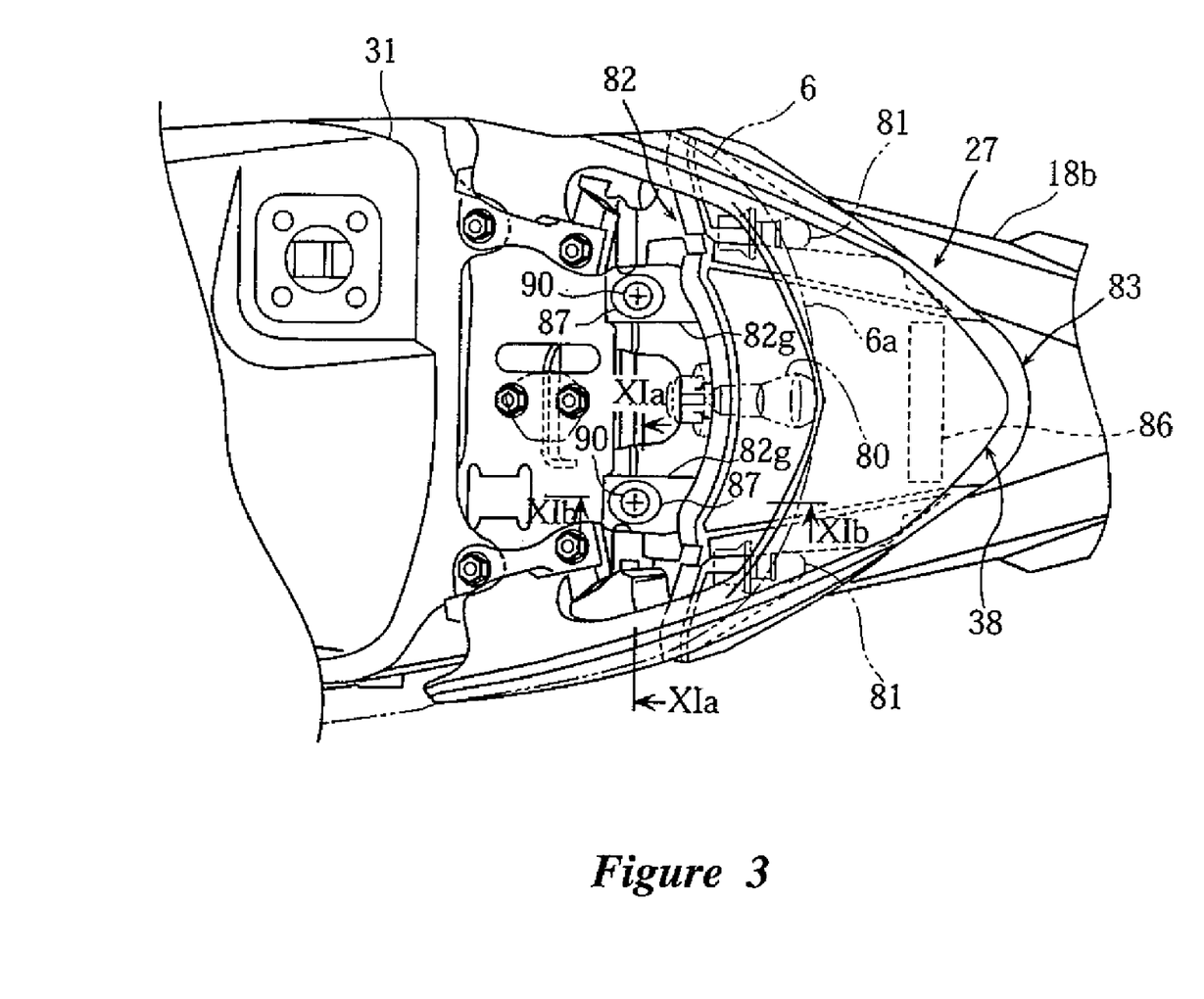
FIG. 3 is a plan view of the rear portion of the motorcycle from FIG. 2.

FIG. 3 is a plan view of the rear portion of the motorcycle 1 from FIG. 1. The light unit 27 is preferably located near the middle of the vehicle in a width direction. The light unit 27 may include one or more bulbs. For example, the illustrated light unit 27 includes a tail lamp bulb 80, flasher bulbs 81, 81, a lamp body 82, and an outer lens or cover 83. The tail lamp bulb 80 lights when the rider operates the brakes. The flasher bulbs 81, 81 are positioned to the left and right sides of the tail lamp bulb 80 and flash when the rider operates a switch. The lamp body 82 preferably detachably holds each flasher bulb 81 and the tail lamp bulb 80. The outer lens 83 is made of a transparent resin or the like and is preferably shared by all of the bulbs 80, 81. The outer lens 83 is positioned so as to cover a lens opening 82a of the lamp body 82 (see FIGS. 7 and 8).

Figure 4:
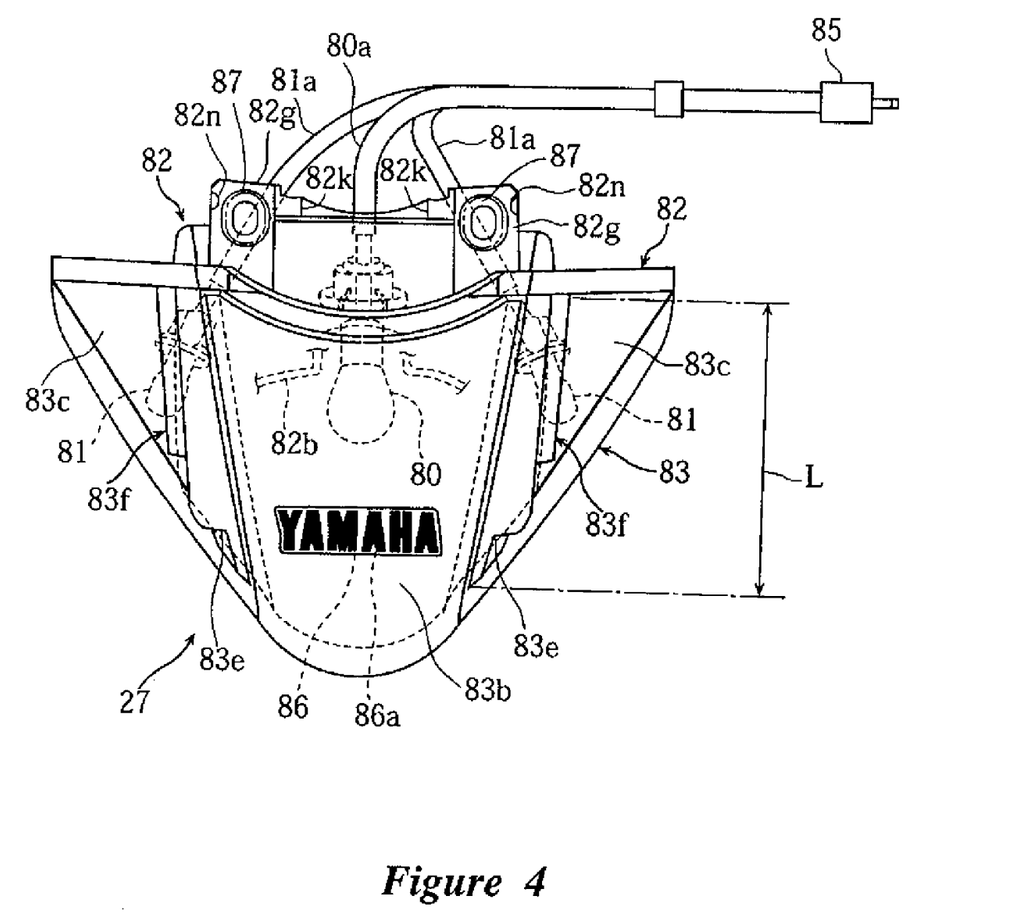
FIG. 4 is a plan view of the light unit from FIG. 3 removed from the motorcycle.

FIG. 4 is a plan view of the light unit 27 from FIG. 3 removed from the motorcycle 1. Power cords 80a, 81a, 81a are respectively connected to the tail lamp bulb 80, and the left and right flasher bulbs 81. Each power cord 80a, 81a is connected via a connector 85 to a power source, such as a battery.

Figure 5:
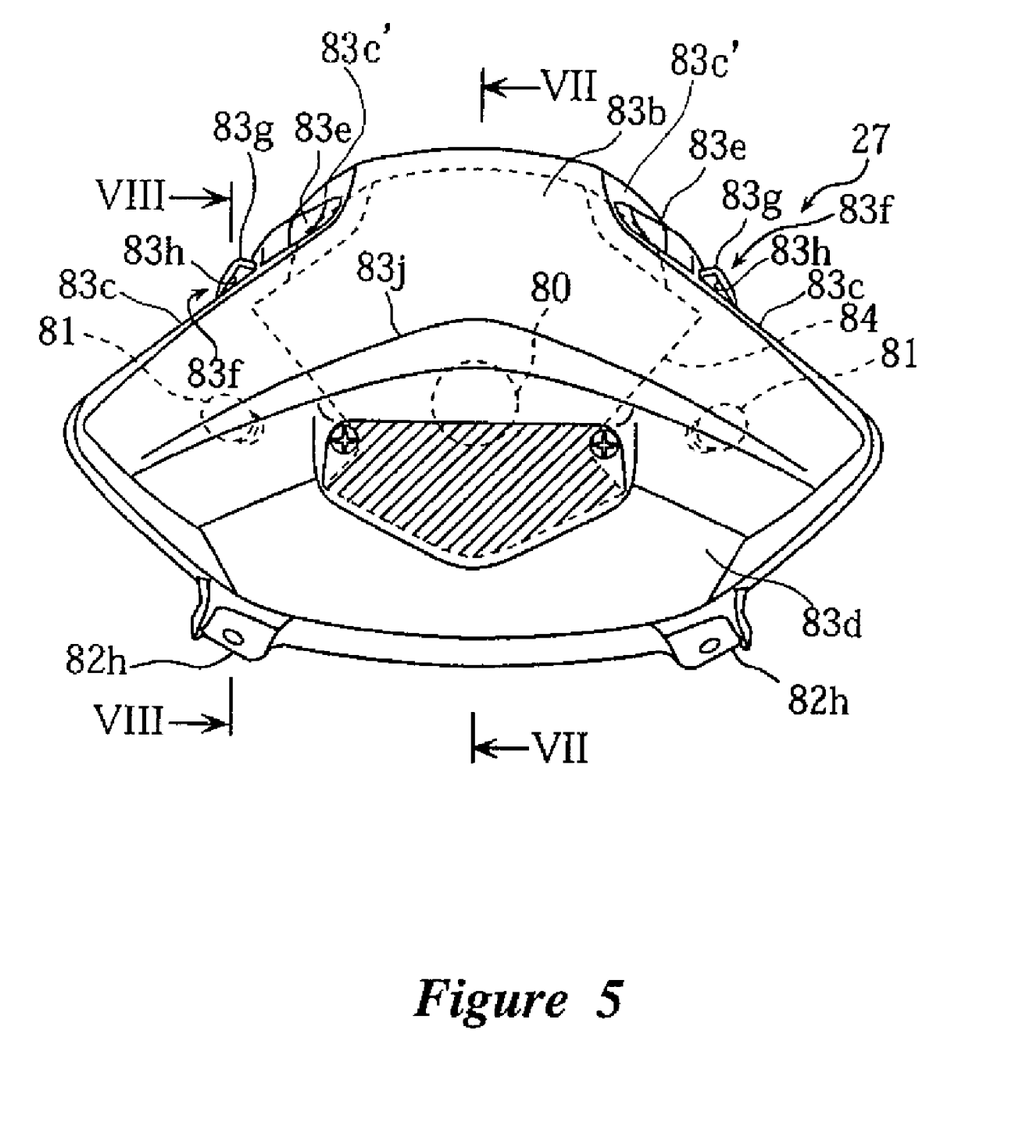
FIG. 5 is a rear view of the light unit from FIG. 4.
Figure 6:
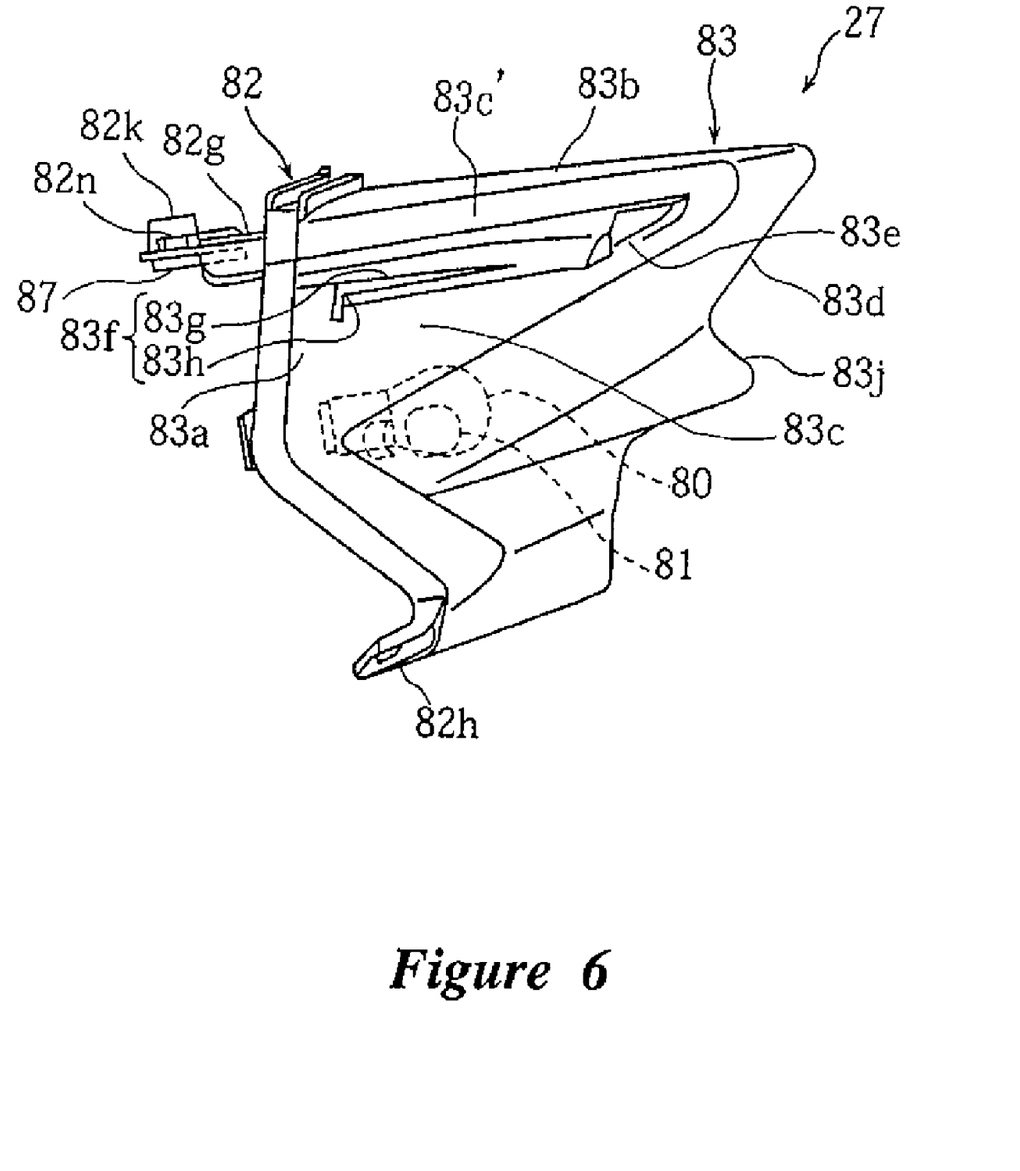
FIG. 6 is a side view of the light unit from FIG. 4.
Figure 7:
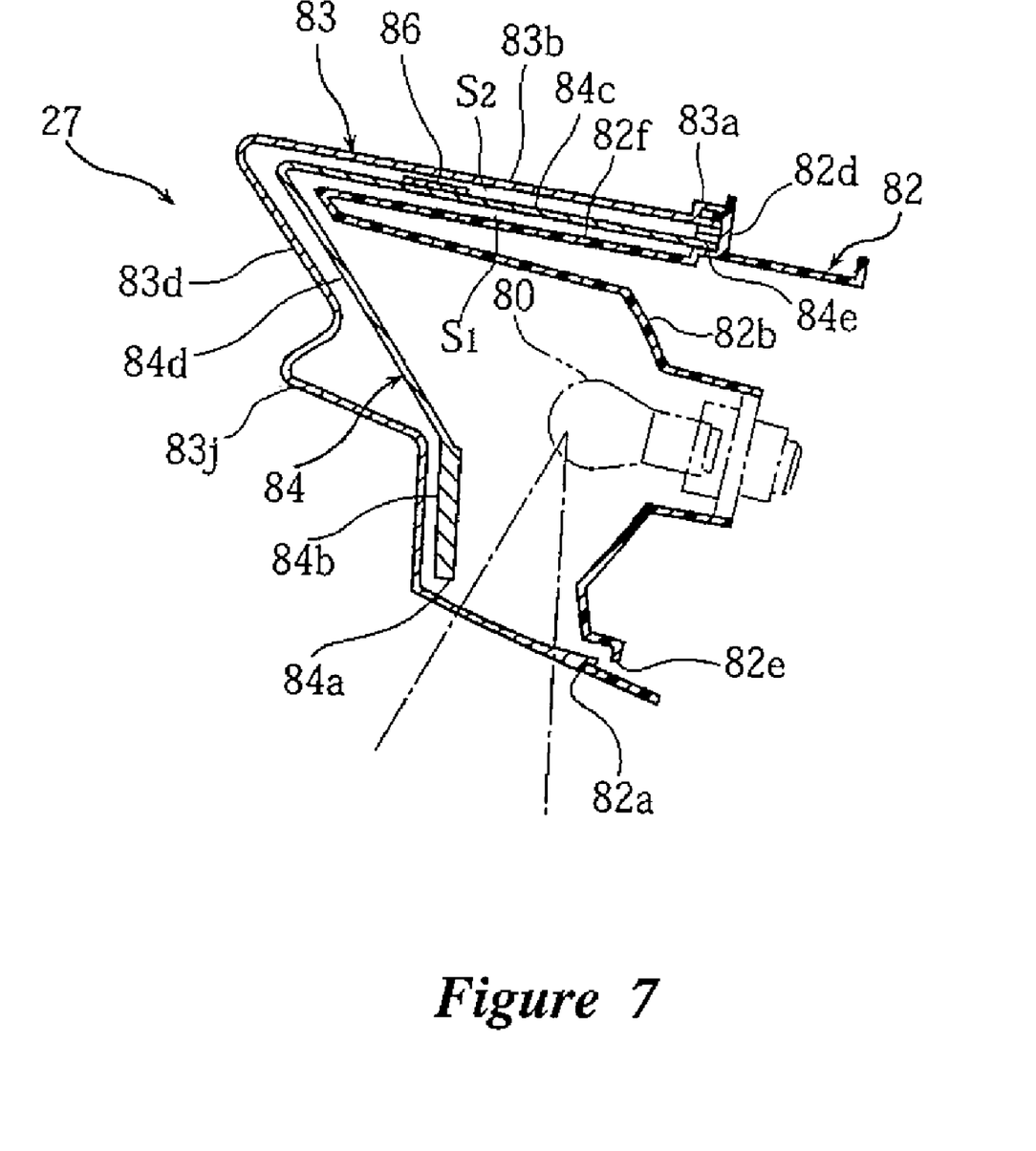
FIG. 7 is a cross sectional side view of the light unit taken along line VII-VII in FIG. 5.

FIG. 5 is a rear view of the light unit 27 from FIG. 4. FIG. 6 is a side view of the light unit 27 from FIG. 4. FIG. 7 is a cross sectional side view of the light unit 27 taken along line VII-VII in FIG. 5. As is illustrated in FIG. 7, the lamp body 82 includes a center reflector 82b. The center reflector 82b preferably has a bowl-like shape and receives the tail lamp bulb 80.

Figure 8:
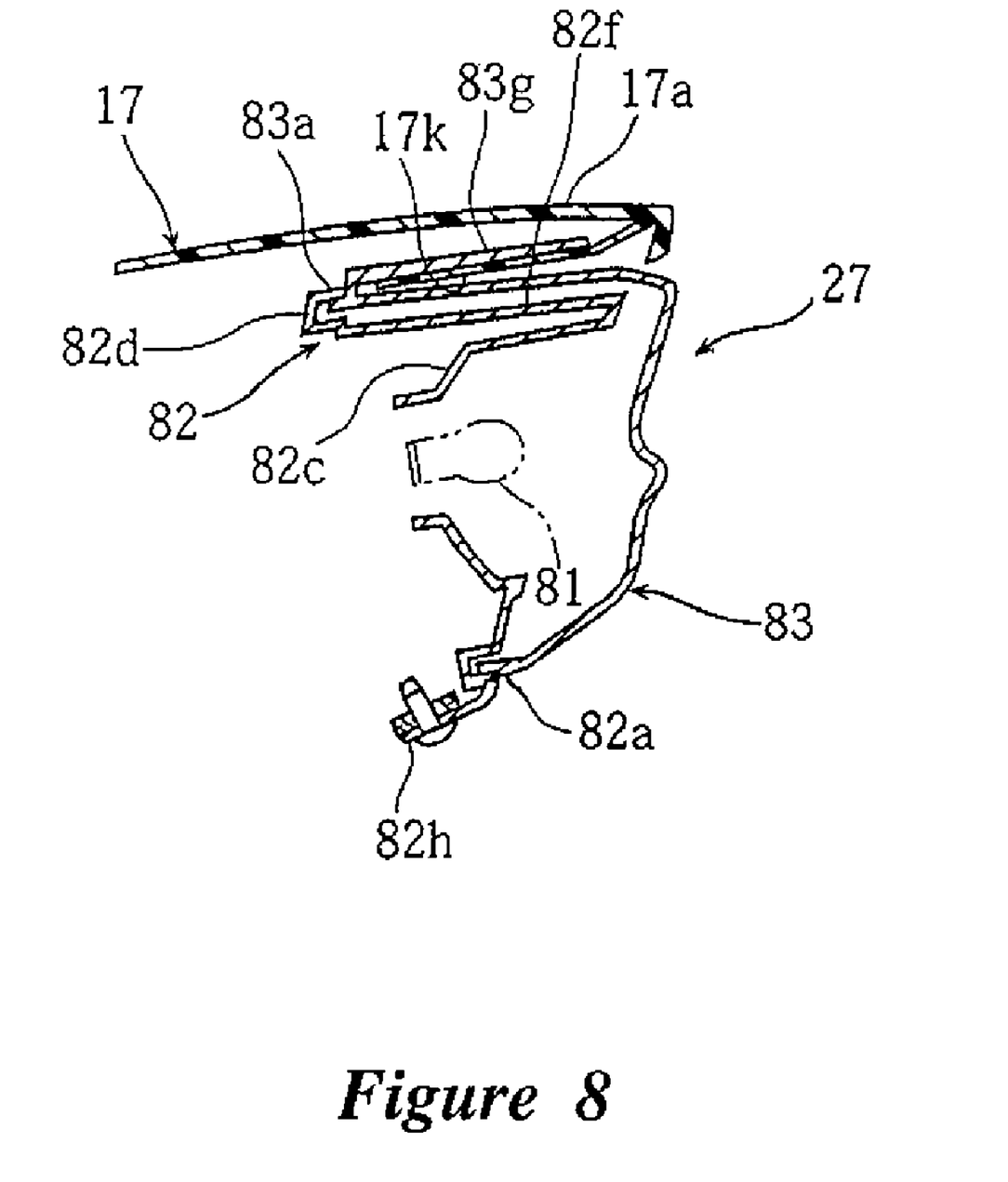
FIG. 8 is a cross sectional side view of the light unit taken along line VIII-VIII in FIG. 5.
Figure 9:
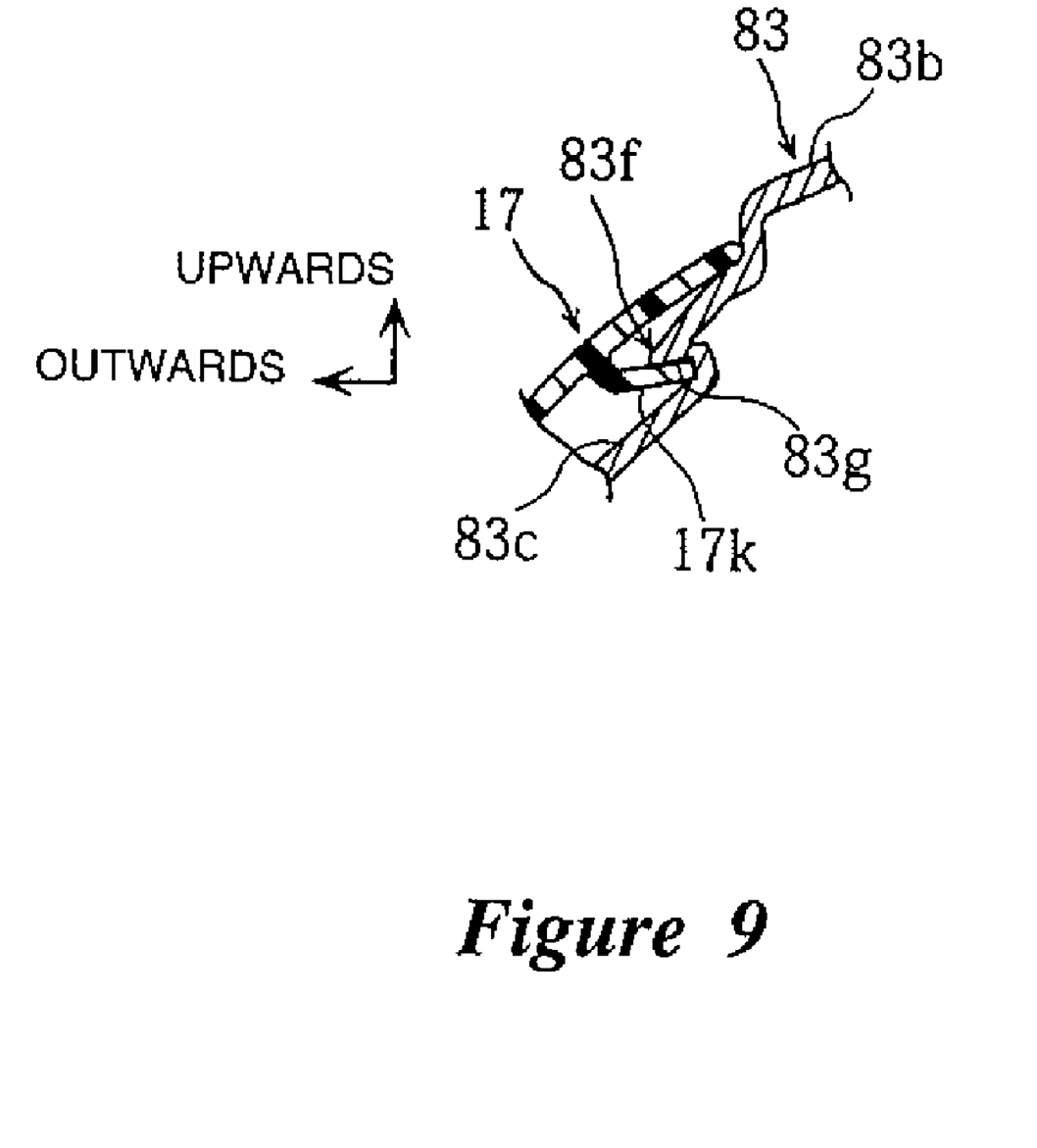
FIG. 9 is a cross sectional rear view taken along line IX-IX in FIG. 2 showing the light unit engaged with the vehicle body via an engagement section.
Figure 10:
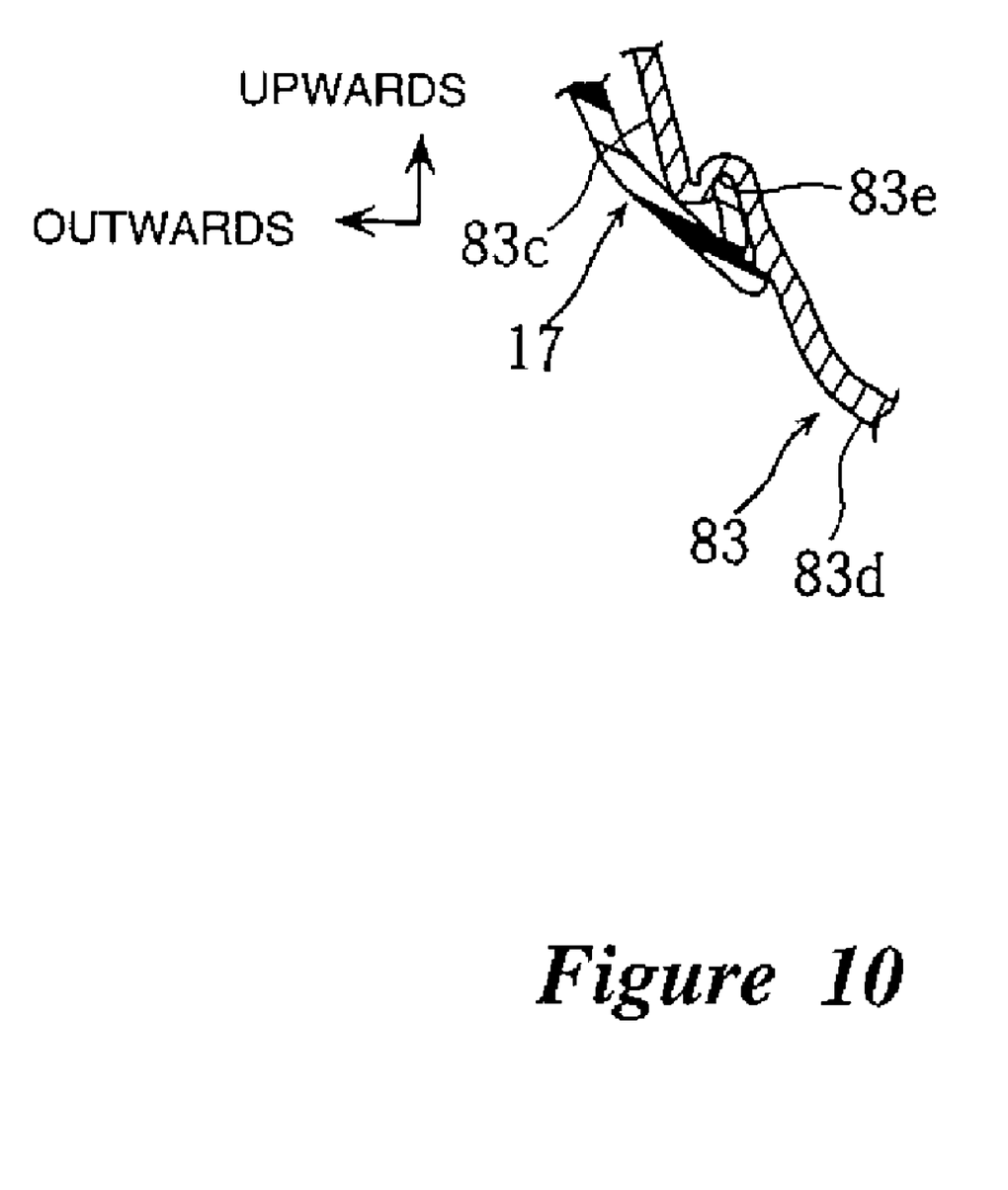
FIG. 10 is a cross sectional plan view taken along line X-X in FIG. 2 showing the light unit engaged with the vehicle body via another engagement section.

FIG. 8 is a cross sectional side view of the light unit 27 taken along line VIII-VIII in FIG. 5. As is illustrated in FIG. 8, the lamp body 82 further includes left and right reflectors 82c. The left and right reflectors 82c preferably have bowl-like shapes and receive the left and right flasher bulbs 81, 81, respectively. An inner surface of each reflector 82b, 82c includes a reflecting surface. The reflecting surfaces may be formed by, for example, vapor-depositing aluminum. The reflecting surfaces reflect light from the bulbs 80, 81 towards the outer lens 83. The lamp body 82 and the reflectors 82b, 82c may be integrally or separately formed.

The lamp body 82 includes an engagement groove 82d formed around the outer circumference of the lens opening 82a. The engagement groove 82d engages with the outer edge 83a of the outer lens 83, preferably in a water-tight manner. The center reflector 82b of the lamp body 82 may include a lower drain hole 82e.

As most clearly shown in FIGS. 5 and 7, the light unit 27 further includes an inner lens 84. The lens 84 fits over an opening in the center reflector 82b. The inner lens may be made from resin or other material. The inner lens 84 is preferably colored red. As most clearly illustrated in FIG. 7, the inner lens 84 has a transparent section 84d that covers the opening of the center reflector 82b. An upper side wall 84c of the inner lens 84 extends between a rear upper edge of the transparent section 84d and the engagement groove 82d. The front edge 84e of the upper side wall 84c engages with the engagement groove 82d.

A notch 84a may be formed in a lower portion of the inner lens 84. The notch 84a allows light from the tail lamp bulb 80 to directly illuminate a license plate without passing through the inner lens 84. A shielding member 84b inhibits the light emitted by the tail lamp bulb 80 from exiting the inner lens 84 in a rearward direction so as to make it difficult for someone looking at the rear of the motorcycle 1 to see the tail lamp bulb 80.

The outer lens 83 preferably surrounds the outside of each reflector 82b, 82c and engages with the engagement groove 82d of the lamp body 82. The outer lens 83 generally protrudes in a rearward direction from the left and right side covers 17, 17.

As shown most clearly in FIGS. 5 and 7, the outer lens 83 includes an upper wall section 83b, left and right side wall sections 83c, 83c, and a rear wall section 83d. The upper wall section 83b has a generally flat shape and extends across the motorcycle 1 and between the rearward-most sections 17a, 17a of the left and right side covers 17, 17. As shown most clearly in FIG. 4, the left and right side wall sections 83c, 83c have a generally sideways V-shape when viewed from the side and extend downward in a step-like manner from the left and right side edges of the upper wall section 83b. As shown most clearly in FIG. 5, the rear wall section 83d has a curved shape and connects to the left and right side wall sections 83c, 83c and the upper wall section 83b. The upper wall section 83b is positioned on the rear side of the seat 6.

As shown most clearly in FIG. 2, a front edge section of the upper side wall section 83b is inserted beneath the seat 6 and forward of a rear edge 6a of the seat 6. In addition, the rear wall section 83d includes a rearwardly protruding section 83e that improves the external appearance of the outer lens 83.

Notches 17b are formed in the rear end sections 17a of the left and right side covers 17. The notches 17b may have a generally sideways V-shape and generally extend along the left and right side wall sections 83c, 83c of the outer lens 83. When the vehicle is viewed from the side, rear sections of the left and right side wall sections 83c, 83c are visible through the notches 17b. Accordingly, it is possible to see flashing light being emitted by the flasher bulbs 81 after the light passes through the rear wall section 83d.

The outer lens 83 includes front side and rear side engagement members 83f, 83g. The front side and rear side engagement members 83f, 83g engage with the rear end sections 17a of the left and right side covers 17. The front side and the rear side engagement members 83f, 83g cover the rear end sections 17a.

As shown most clearly in FIG. 7, the light unit 27 further includes a shadow-forming wall section 82f. At least a portion of the shadow-forming wall section 82f comprises an opaque material. The shadow-forming wall section 82f is preferably integrated with the lamp body 82. The shadow-forming wall section 82f may be disposed above each reflector 82b, 82c and extends toward the front of the motorcycle 1 and around the rear edge of each reflector 82b, 82c. The shadow-forming wall section 82f is generally parallel to the upper wall section 83b of the outer lens 83 and the upper side wall 84c of the inner lens 84. The engagement groove 82d is preferably an integral part of the forward end of the shadow-forming wall section 82f.

Light emitted by the tail lamp bulb 80 is reflected in a rearward direction by the reflector 82b. However, a portion of the light reaches the bottom of the seal 86 through a gap between the rear end of the reflector 82b and the inner lens 84 and then through gap S1. Most of the light from the tail lamp bulb 80 is shielded by the reflectors 82b, 82c and thus does not directly reach the shadow-forming wall section 82f.

The upper side wall 84c of the inner lens 84 is generally parallel with the shadow-forming wall section 82f and is spaced from the shadow-forming wall section 82f by the distance or gap S1. The upper side wall 84c is also generally parallel to the upper wall section 83b of the outer lens 83 and is spaced from the upper wall section 83b by a distance or gap S2. The gaps S1, S2 preferably are the same size. The lengths of the shadow-forming wall section 82f, the upper side wall 84c, and the upper wall section 83b of the outer lens 83 are also preferably the same size.

As shown most clearly in FIGS. 4 and 7, the seal 86 is attached to the top surface of the upper side wall 84c of the inner lens 84. The seal 86 is made of a light permeable thin film and includes a shadow casting design 86a. The design 86a, such as for example a logo mark, is printed on the seal 86. In this way, someone viewing the motorcycle 1 can see the seal 86 though the outer lens 83. The design 86a inhibits outside light from passing through the design 86a. The design 86a thus casts a shadow on the upper surface of the shadow-forming wall section 82f.

The gap S1 is defined between the inner lens 84 on which the seal 86 is attached and the shadow-forming wall section 82f. Accordingly, the shadow is formed at a distance equivalent to the gap S1 below the design 86a. As a result, the shadow gives a viewer the impression that the design 86a is a three-dimensional object that is floating upwards.

Figure 12:
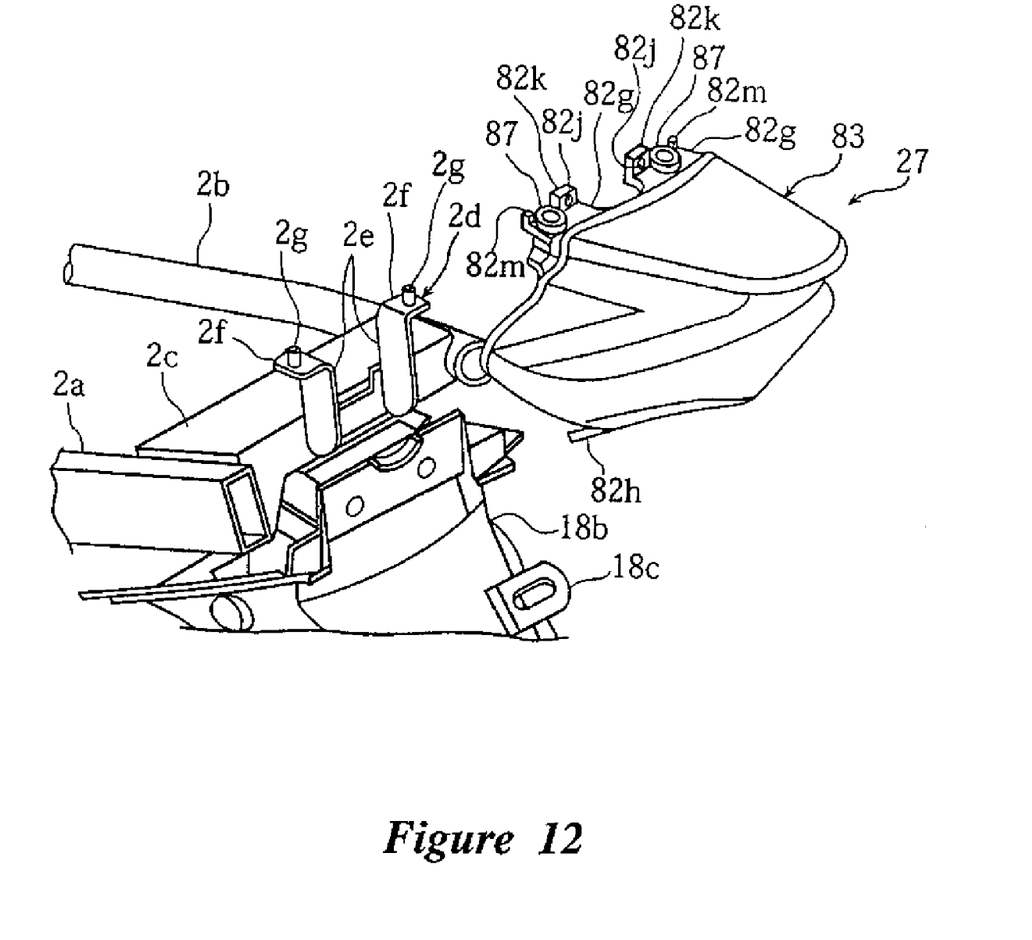
FIG. 12 is a rear perspective view showing an assembled light unit being aligned with the body of the vehicle for installation.

FIG. 12 is a rear perspective view showing an assembled light unit 27 being aligned with the body of the motorcycle 1. The body frame 2 further includes a cross member 2c that spans between the left and right seat rail members 2a, 2b. A bracket 2d is fixed to a rear surface of the cross member 2c. The bracket 2d may be generally U-shaped and includes left and right fixing tabs 2e, 2e and attachment seats 2f, 2f. The attachment seats 2f, 2f may be formed by bending the upper end sections of the left and fixing tabs 2e, 2e in at outward direction 2e, 2e.

The bracket 2d further includes bosses 2g. The bosses 2g may be disposed on the left and right attachment seats 2f, 2f and have a cylindrical shape. The seat 6 covers the bracket 2d. With the seat 6 removed, the front side of the light unit 27 is exposed through the frame 2 and the tail lamp bulb 80 and the flasher bulbs 81 can be replaced.

The lamp body 82 includes pairs of upper side and lower side fixing members 82g, 82h. The fixing members 82g, 82h protrude forward from the upper and lower edges of the lamp body 82.

To attached the light unit 27 to the body 2, the left and right upper side fixing members 82g, 82g are attached to the left and right bosses 2g with, for example, rubber grommets 87 interposed therebetween. The grommets 87 may have an elliptical shape with their major axis extending toward the front of the motorcycle 1. The lamp body 82 may further include support members 82k and protrusions 82m. Each support member 82k has a support hole 82j with an opening that faces the front and rear directions. The protrusions 82m are formed in the left and right upper side fixing members 82g, 82g and protrude in an upward direction.

The grommets 87, 87 allow the position of the light unit 27 to be adjusted in the fore and aft directions. The grommets 87, 87 further inhibit misalignment or damage occurring to the bulbs 80, 81 caused by vibration or the like.

Figure 13:
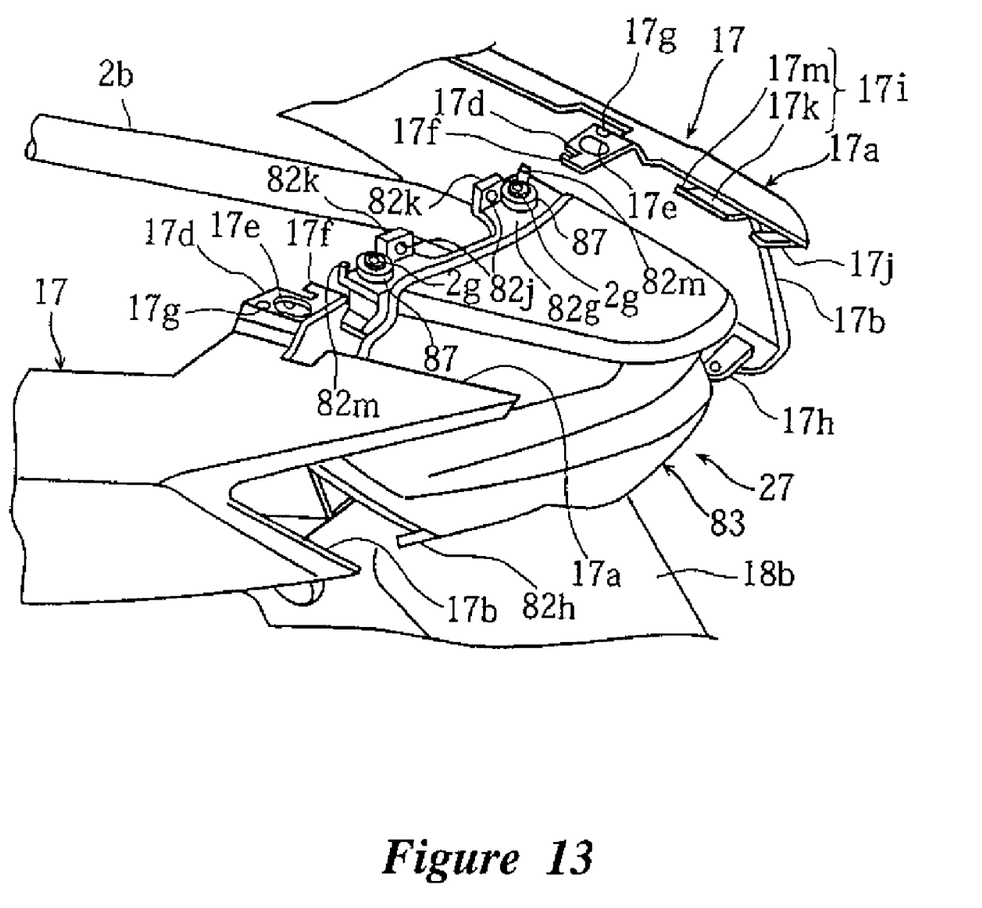
FIG. 13 is a rear perspective view showing the side covers being installed on the body of the vehicle.

FIG. 13 is a rear perspective view showing the side covers 17 being installed on the body 2 of the vehicle. The side covers 17 include upper side attachment tabs 17d, 17d. The attachment tabs 17d, 17d are formed on the upper rear end sections 17a of the left and right side covers 17 and extend inward so as to overlap with the left and right upper side fixing members 82g. The left and right upper side attachment tabs 17d, 17d are fitted over the left and right bosses 2g, respectively. The attachment tabs 17d, 17d include long holes 17e that allow positional adjustment in the front-rear direction, hooks 17f that engage with the support holes 82j of the support members 82k, and positioning holes 17g that ensure correct positioning of the protrusions 82m. To properly locate the side covers 17 to the body 2 in the fore and aft directions, the protrusions 82m need only be aligned with the positioning holes 17g.

Figure 11A:
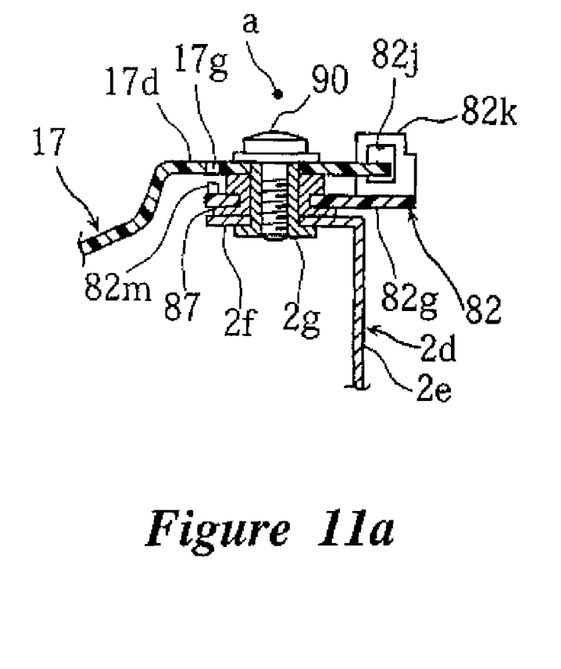
FIG. 11a is a cross sectional rear view taken along line XIa-XIa in FIG. 3 showing the light unit engaged with the vehicle body via side screws.
Figure 11B:
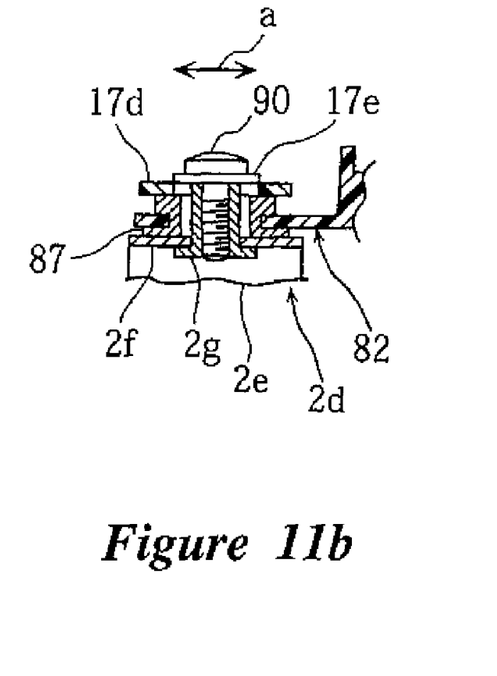
FIG. 11b is a cross sectional side view taken along line XIb-XIb in FIG. 3 showing the light unit engaged with the vehicle body via the side screws.

FIG. 11a is a cross sectional rear view taken along line XIa-XIa in FIG. 3 showing the light unit 27 engaged with the vehicle body via side screws 90. FIG. 11b is a cross sectional side view taken along line XIb-XIb in FIG. 3 showing the light unit 27 engaged with the vehicle body via the side screws 90. The left and right upper side attachment tabs 17d and the upper side fixing members 82g are fixed to the bracket 2d with the side screws 90. The side screws 90 enter the upper sides of the bosses 2g and allow the forward/aft position of the light unit 27 to be adjusted as illustrated by the direction "a" in FIGS. 11a and 11b.

Figure 14A:
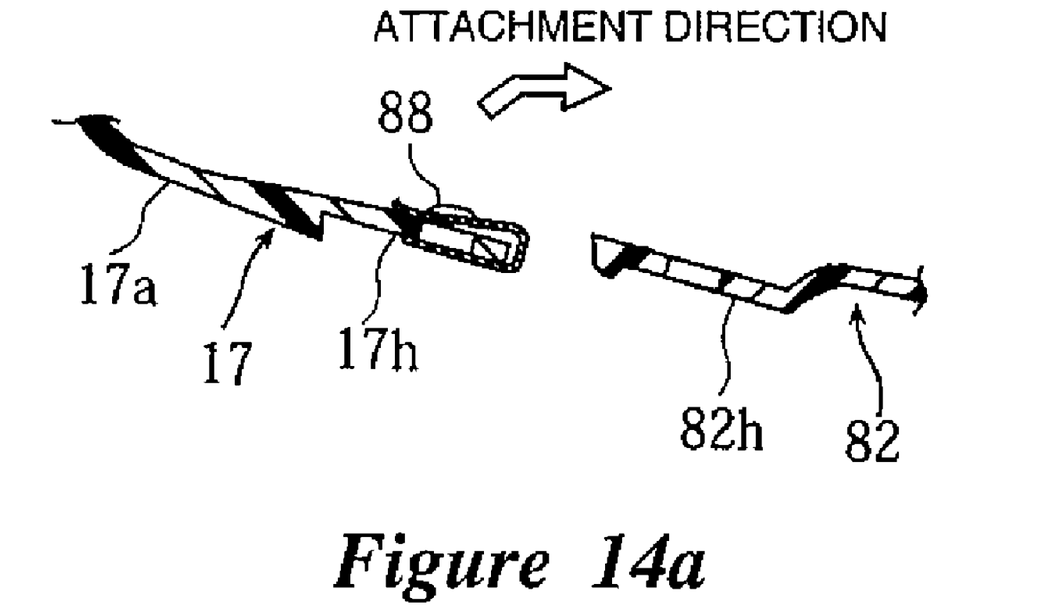
FIG. 14a is a rear perspective view showing the lower sides of the covers being aligned with the lower sides of the fixing members of the lamp body.
Figure 14B:
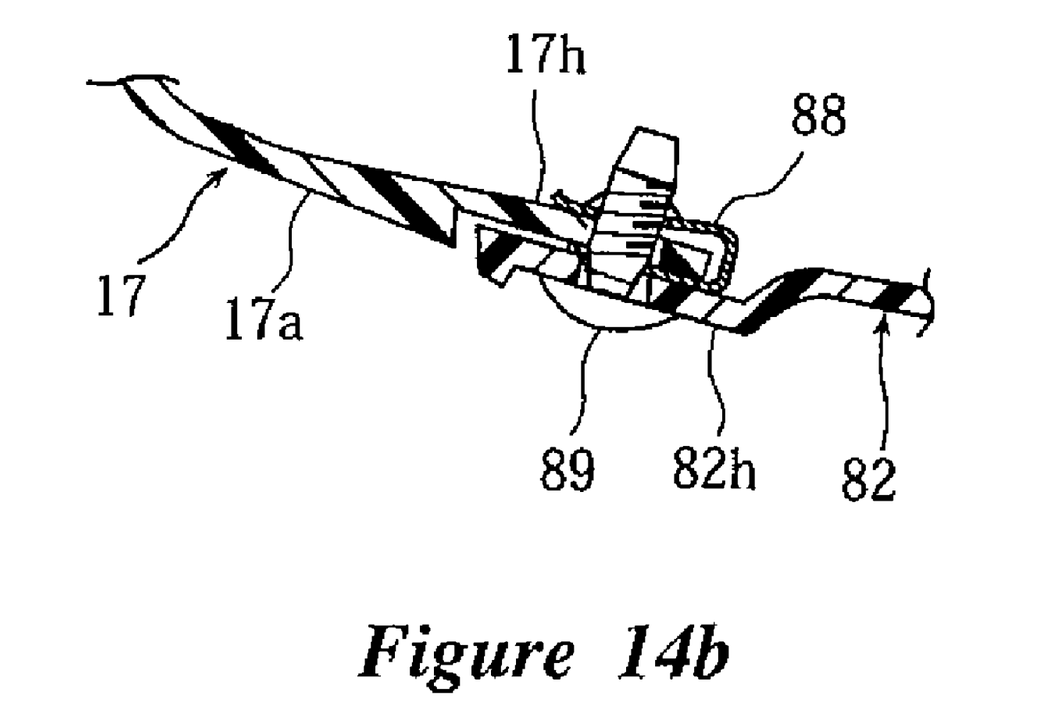
FIG. 14b is a rear perspective view showing the lower sides of the covers engaged with the lower sides of the fixing members of the lamp body.

FIG. 14a is a rear perspective view showing the lower sides of the covers 17, 17 being aligned with the lower sides of the fixing members 82h, 82h of the lamp body. FIG. 14b is a rear perspective view showing the lower sides of the covers 17, 17 engaged with the lower sides of the fixing members 82h, 82h.

Each cover 17 includes a lower side attachment tab 17h that overlaps with the upper surface of the respective lower side fixing member 82h. Respective spring nuts 88 are fitted to the left and right lower side attachment tabs 17h. During assembly, the left and right lower side attachment tabs 17h are bent in the direction indicated by the arrow shown in FIG. 14a so that they overlap the lower side fixing members 82h. Lower side screws 89 are screwed in from below to fix the left and right lower side attachment tabs 17h to the lower side fixing members 82h.

As most clearly shown in FIGS. 2, 5, and 6, the outer lens 83 includes left and right recesses 83c'. Each recess 83c' is disposed in an upper section of the side wall section 83c of the outer lens 83. The outer lens 83 further includes one or more front side engagement members 83f, 83f and one or more rear side engagement members 83e, 83e. The front side engagement members 83f, 83f and rear side engagement members 83e, 83e are respectively formed in front and rear sections of the surfaces of each recess 83c'.

The front side engagement members 83f, 83f engage with the left and right side covers or other exterior body component 17, 17. The front side engagement members 83f may align with the center reflector 82b along the longitudinal axis of the motorcycle 1. The front side engagement member 83f may be located along the longitudinal axis of the motorcycle 1 so as to be aligned with the center reflector 82b of the lamp body 82. With such an arrangement, the light unit 27 engages with the motorcycle 1 near the center of gravity. The locations of the center of gravity of the front side engagement members 83f and the center of gravity of the tail lamp unit 27 are preferably the same.

Positioning of the outer lens 83 with respect to the left and right side covers 17 is more reliable and accurate. As a result, misalignment is less likely to occur which maintains the pleasing appearance of the motorcycle 1. As shown most clearly in FIG. 4, the lengths of the alignment lines L along the left and right edges of the upper wall section 83b of the outer lens 83 and the upper edge of the rear end section 17a of the side covers 17 can be extended in the front-rear direction to further increase the positional accuracy of the light unit 27.

As shown most clearly in FIGS. 2 and 6, the rear end sections 17a of the side covers 17 are positioned in the recesses 83c' of the side wall sections 83c so as to cover the front side and rear side engagement members 83f, 83e. With the light unit 27 attached to the body 2, the front and rear side engagement members 83f, 83e are located on either side of the light unit 27 and do not block light emitted by the bulbs 80, 81 through the outer lens 83. The engagement members 83f, 83e preferably do not shield light being emitted by the bulbs 80, 81 and do not adversely affect the operation of the tail lamp unit 27. The front and rear side engagement members 83f, 83e preferably are covered by the side covers 17 so as to be invisible from outside the motorcycle 1.

Each front side engagement member 83f may include a shelf shaped portion 83g and a front side engagement recess 83h. The shelf shaped portion 83g may extend linearly from the front edge section of the outer lens 83 towards the rear. The front side engagement recess 83h may be disposed in the front end section of the shelf section 83g. The left and right rear side engagement members 83e may have a recessed shape.

As most clearly shown in FIG. 13, the side covers 17 include front and rear engaged tabs 17i, 17j formed on the upper side of the rear end sections 17a, 17a. The tabs 17i, 17j engage with the front and rear engagement members 83f, 83e of the light unit 27. Each front side tab 17i may include a flat plate member 17k and a hook 17m formed in the plate member 17k. With the light unit 27 installed, the plate member 17k abuts a lower surface of the shelf member 83g. The hooks 17m engage with the front side engagement recess 83h. Each tab 17j may have a shape similar to the shape of the tabs 17i. The hook-like shape of the tab 17j engages the rear side engagement member 83e.

The left and right side covers 17, 17 support the outer lens 83. When assembled to the body 2, each upper side member 82g of the light unit 27 engages with the bracket 2d and one of the upper side attachment tabs 17d of the side cover 17. The front and rear side engagement members 83f, 83e of the light unit 27 engage with the front and rear side engaged tabs 17i, 17j of the side cover 17. When assembled, the outer lens 83 is inhibited from moving in a downward direction caused by the weight of the tail lamp unit 27 and maintains the pleasing appearance of the motorcycle 1.

When assembled, the size of any gaps between the outer lens 83 and the side covers 17, 17 is controlled. The pleasing external appearance is maintained since the front and rear side engagement members 83f, 83e are hidden from view when the light unit 27 is installed on the motorcycle 1.

An exemplary method for assembling the tail lamp unit 27 with the left and right side covers 17, 17 is provided below. The described method is but one method for assembly and is not intended to limit the scope of the invention.

As most clearly shown in FIGS. 12 and 13, the grommets 87, 87 of the left and right upper side fixing members 82g, 82g of the lamp body 82 are fitted to the bosses 2g, 2g of the attachment seats 2f, 2f of the bracket 2d. The lower side fixing member 82h is placed into contact with the rear surface of the rear fender section 18b. The tail lamp unit 27 is roughly positioned in the up-down direction.

The left and right side covers 17 are attached to the outer lens 83 by moving the side covers 17 from a position that is slightly to the side and diagonally rearward of the outer lens 83 toward the outer lens 83. As most clearly shown in FIG. 14, the lower side attachment tabs 17h of the side covers 17 elastically deform in an upwards direction so as to overlap with the upper side of the lower side fixing members 82h of the outer lens 83.

Next, the side covers 17 are moved slightly forward so that the front side engaged tabs 17i engage with the front side engagement members 83f of the outer lens 83, and the rear side engaged tabs 17j engage with the rear side engagement members 83e. In addition, the hooks 17f are inserted into the support members 82k such that the positioning holes 17g align with the protrusions 82m. The upper side screws 90 fix the upper side attachment tabs 17d and the upper side fixing members 82g to the bracket 2d. The lower side screws 89 fix the lower side attachment members 17h to the lower side fixing members 82h.

Preferably, the recess 83c' is formed in a direction towards the inside of the vehicle body and in the side surface of the outer lens 83. The recess 83c' receives the side cover or other exterior body component of the vehicle 17. The positions of the outer lens 83 and the side covers 17 can be directly aligned so as to improve the positional accuracy of both members.

In the embodiment described above, the light unit 27 includes two lenses with the engagement members 83f, 83e being formed in the outer lens. However, the invention is not limited to a light unit 27 having two lenses and may be applied to a light unit having a single lens or more than two lenses. Additionally, either or both of the inner and outer lens 83, 84 may have some, negligible or no optical powers and may or may not otherwise alter one or more characteristics of light (for example, but not limited to, filtering certain wavelengths of light).

The light unit 27 described above may be used with a motorcycle, scooter, bicycle, automobile, or other vehicle on land, water, or in the air.

In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A motorcycle comprising:
   a body portion including a left side cover and a right side cover;
   a frame arranged between the left side cover and the right side cover separated and spaced from the left side cover; and
   a tail light lens directly connected to a rear portion of the frame; wherein
   the tail light lens includes a left engagement portion arranged to engage with a rear portion of the left side cover; and
   the tail light lens includes a right engagement portion arranged to engage with a rear portion of the right side cover.

2. The motorcycle according to claim 1, wherein the left side cover and the right side cover are arranged to overlap corresponding portions of the left engagement portion and the right engagement portion, respectively.

3. The motorcycle according to claim 1, wherein the left side cover and the right side cover define outer portions of the motorcycle.

4. The motorcycle according to claim 1, further comprising:
   a left recess and a right recess; wherein
   the left recess and the right recess are respectively disposed in left and right side surfaces of the tail light lens and recessed in a direction toward an inside of the body portion;
   the left side cover and the right side cover are respectively positioned in the left recess and the right recess at least when the tail light lens is engaged with the left side cover and the right side cover; and
   the left engagement portion and the right engagement portion are provided in outer surfaces of the left recess and the right recess.

5. The motorcycle according to claim 1, wherein the left engagement portion and the right engagement portion are arranged to control a size of a gap between the tail light lens and the body portion in at least an up-down direction.

6. The motorcycle according to claim 1, wherein the left engagement portion and the right engagement portion are arranged to control a size of a gap between the tail light lens and the body portion in at least a left-right direction.

7. The motorcycle according to claim 1, further comprising a light bulb disposed behind the tail light lens.

8. The motorcycle according to claim 7, wherein the left engagement portion and the right engagement portion are disposed within the tail light lens so as to not block light emitted by the light bulb.

9. The motorcycle according to claim 8, wherein a reflector is disposed behind the light bulb.

10. The motorcycle according to claim 9, wherein the left engagement portion and the right engagement portion are substantially aligned with the reflector along an axis of the motorcycle that extends in a front-rear direction.

11. The motorcycle according to claim 1, wherein the tail light lens includes an inner lens and an outer lens, and the left engagement portion and the right engagement portion are disposed on an inner side of the outer lens.

12. The motorcycle according to claim 1, wherein the tail light lens, the left side cover, and the right side cover are all attached to the frame through a single fastener.

13. The motorcycle according to claim 1, wherein
   forward portions of the left side cover and the right side cover are arranged outside of the frame in a left-right direction when viewed in a front-rear direction of the motorcycle; and
   rearward portions of the left side cover and the right side cover are arranged inside of the frame in the left-right direction when viewed in the front-rear direction of the motorcycle.

* * * * *